March 7, 1939. L. B. HARRIS 2,149,290
VEHICLE SEAT
Filed Jan. 2, 1936 6 Sheets-Sheet 1

INVENTOR
LEONARD B. HARRIS
BY
Joseph Blacker
ATTORNEY

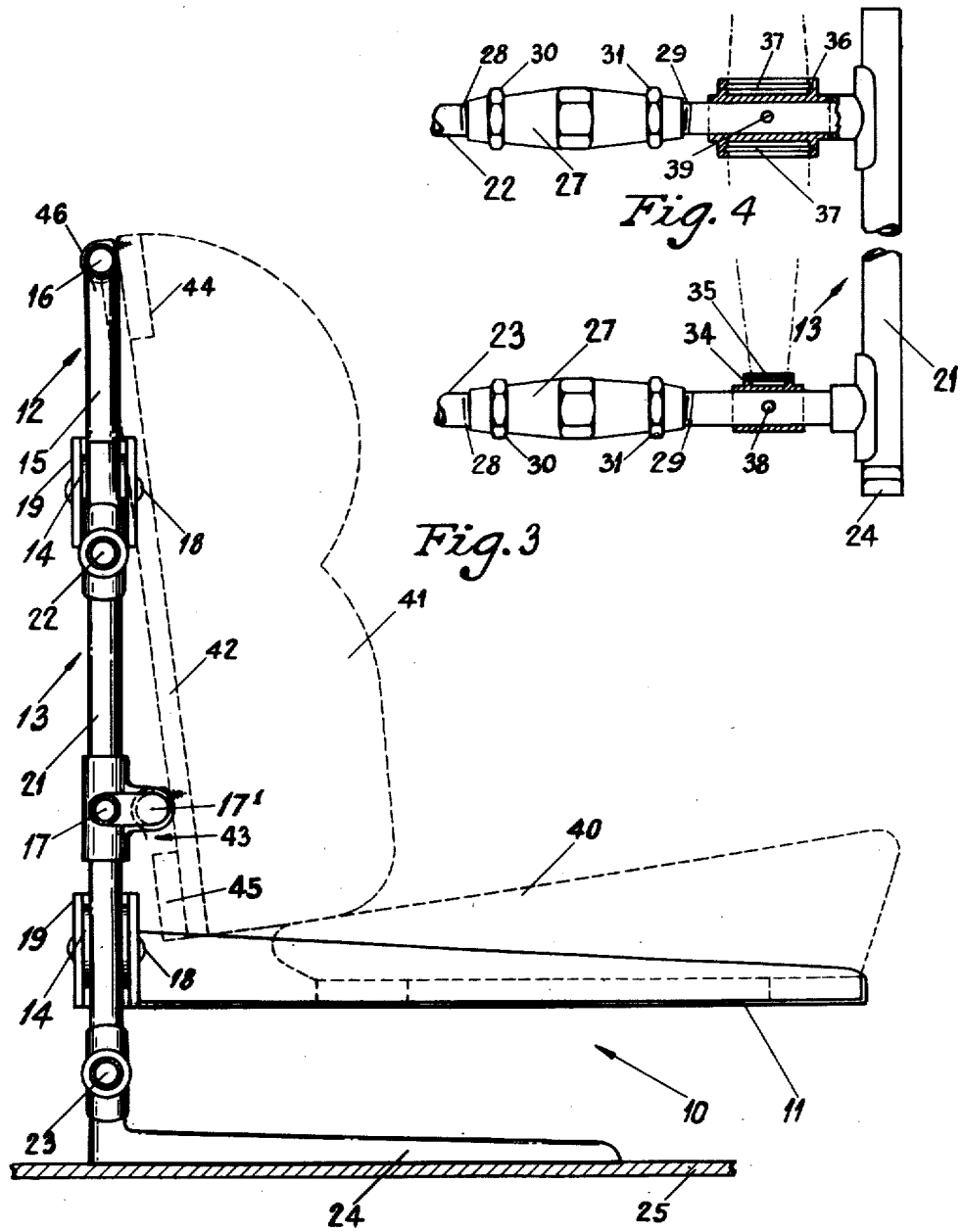

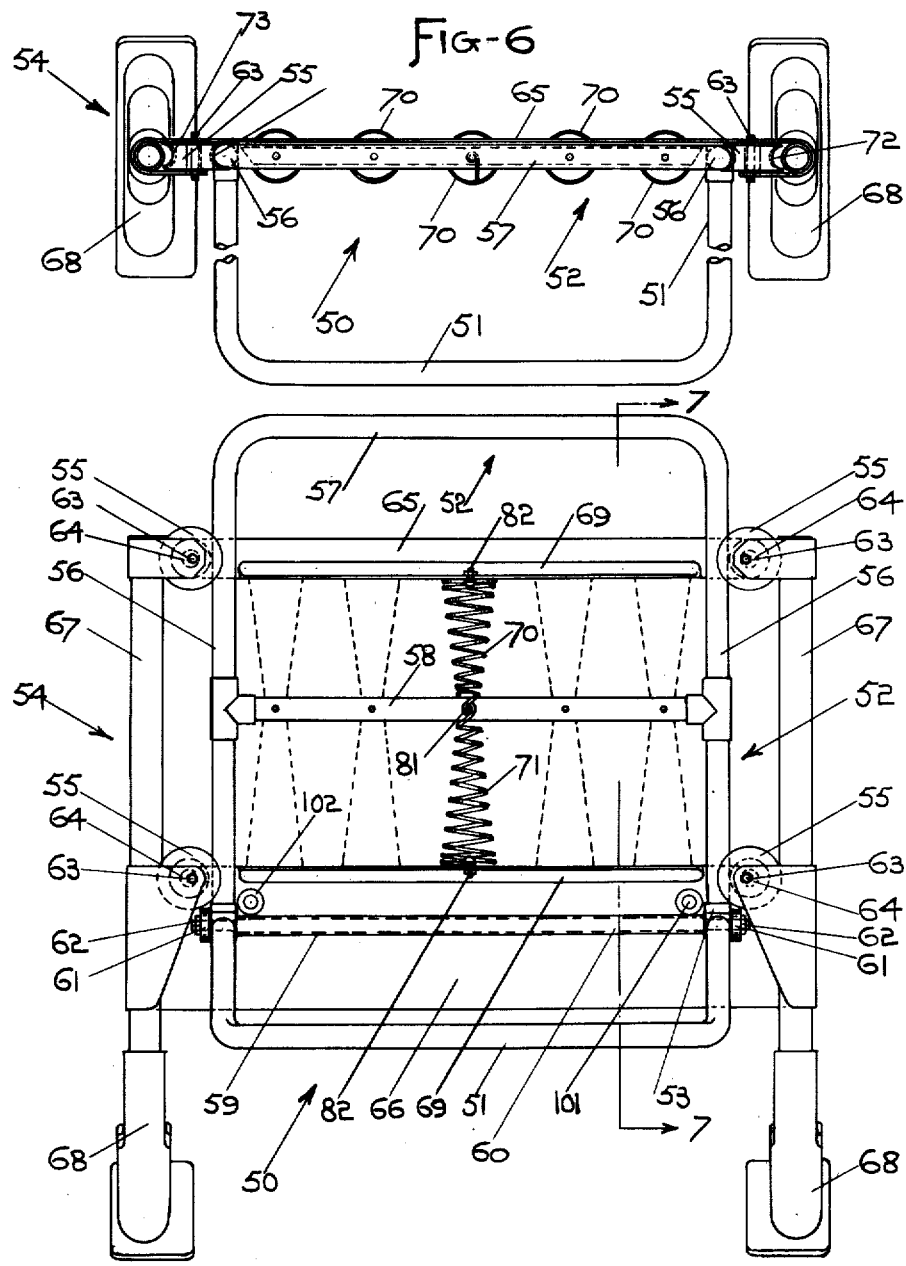

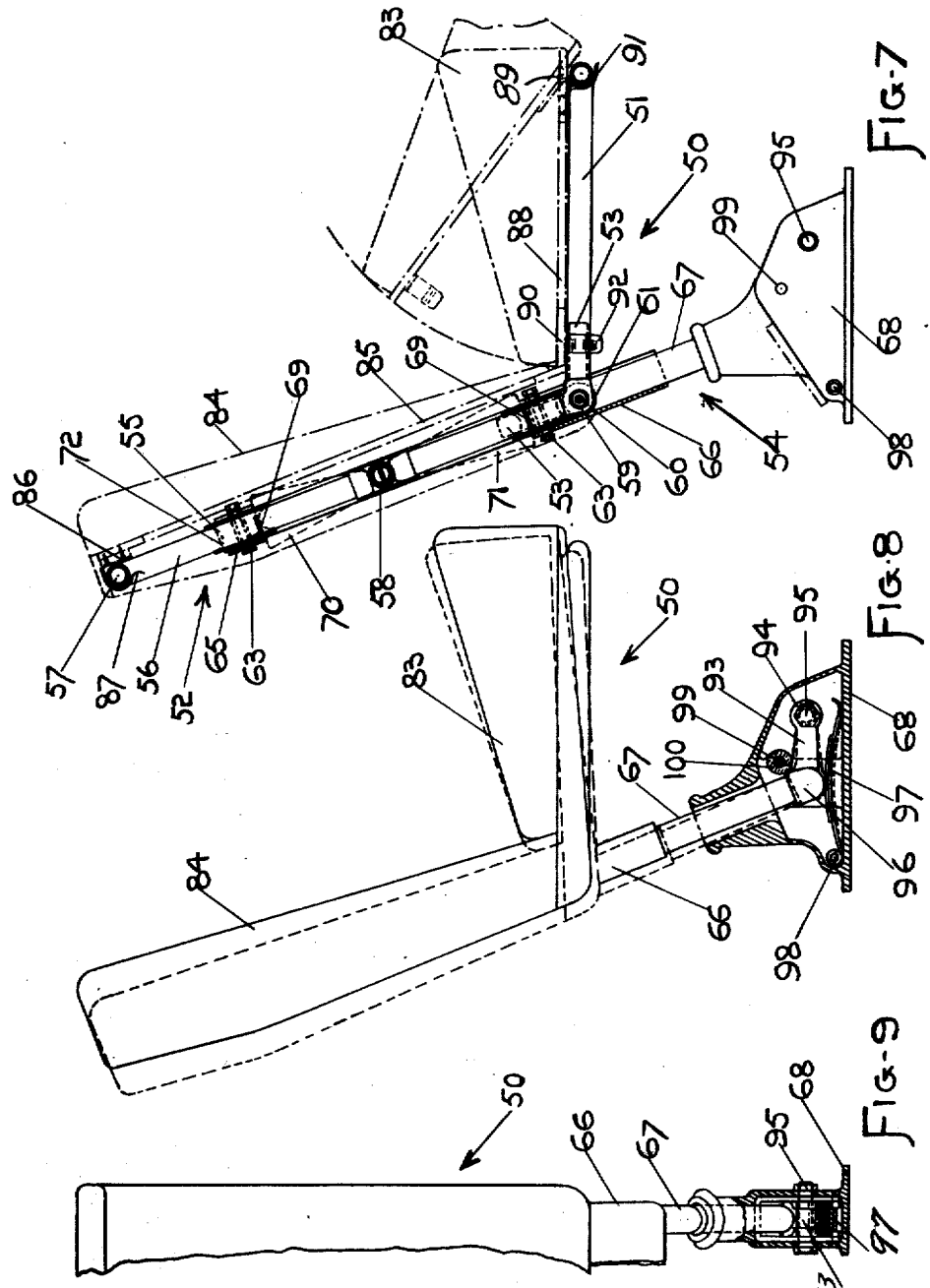

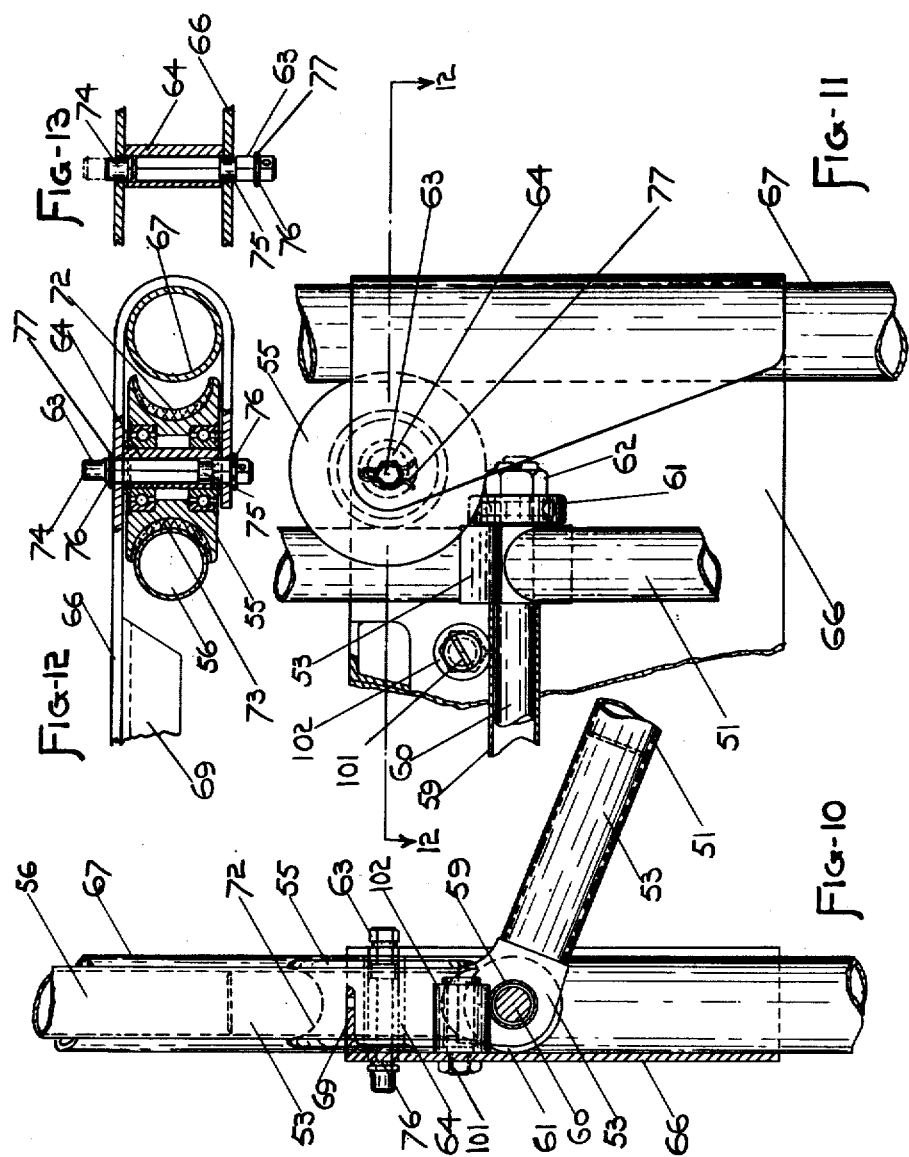

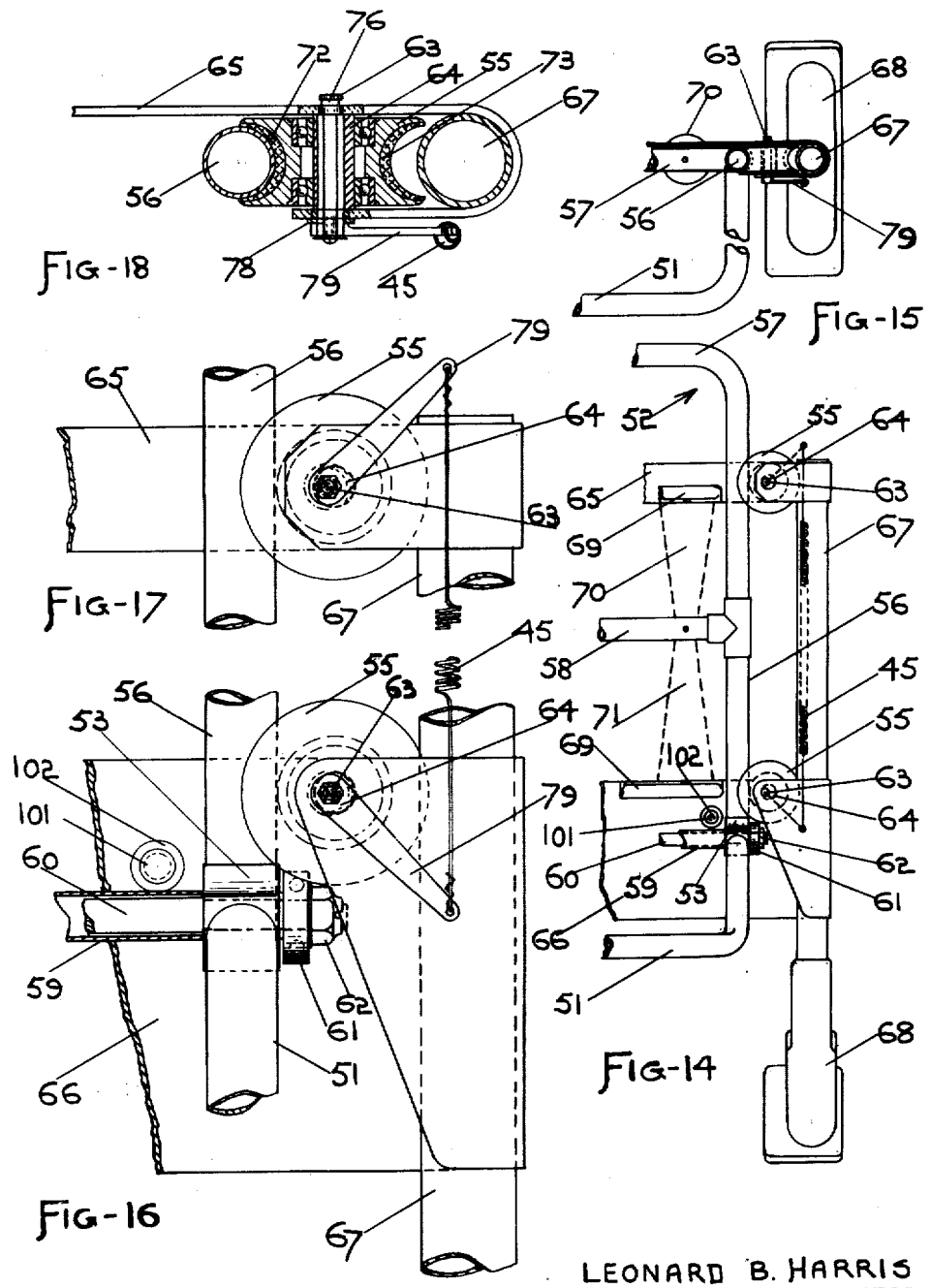

Patented Mar. 7, 1939

2,149,290

UNITED STATES PATENT OFFICE 2,149,290

VEHICLE SEAT

Leonard B. Harris, Bayside, Long Island City, N. Y.

Application January 2, 1936, Serial No. 57,224

5 Claims. (Cl. 155—53)

It is well known that with vehicle seats as heretofore constructed with the back rest fixed to the vehicle, while the seat and passengers move up and down, there results an unpleasant rubbing action of the passenger's back against the back rest when passing over rough roads.

The present invention relates to improvements in shockless multiple-passenger bench seats for vehicles, wherein the entire seat and back rest is built as a unit and is resiliently supported on superposed pairs of springs positioned above the seat level and rearwards of the back rest for generally vertical movement independently of the motion of the vehicle, thus supplementing the action of the vehicle springs and making it possible to take long trips on rough roads without bodily fatigue.

The present application is a continuation in part of my application for patent for vehicle seat, Serial No. 647,427, filed December 15, 1932.

An object of this invention is to provide a unitary seat and back rest frame mounted for generally vertical sliding movement in relation to a stationary frame, the stationary frame having means for fixedly mounting in service to the floor of a vehicle and comprising tubular uprights, the movable frame also comprising tubular uprights, the uprights of the movable frame having a plurality of sheave rollers fixedly mounted thereon and being designed for engagement with the tubular uprights of the stationary frame, whereby the back rest frame and seat unit is guided by the sheave rollers in its movement in relation to the stationary frame on all four sides.

Another object of this invention is to fasten the tubular uprights together by cross members and and to provide the cross members with means for longitudinal adjustment for adjusting the distance between the uprights, and thus compensate for wear taking place between the moving parts.

Another object of this invention resides in the use of semi-circularly grooved rollers which respectively engage with the tubular uprights around their cross sectional circumferences, all rollers being mounted to operate in a single plane passing through the center lines of the uprights of both frames, the axes of all the rollers being transverse to the plane of the frames and only four rollers are necessary for guiding the back rest frame in its movement in relation to the stationary frame on all four sides.

Another object of this invention is to provide a modified arrangement of frames whereby the outer frame is the stationary frame, this structure providing a wider and firmer base and a thinner back-rest.

Another object of this invention is to provide the rollers with adjustable eccentric means for setting up and locking the rollers at assembly to permit close rolling operation.

Another object of this invention is to provide automatic adjustment to compensate for wear taking place between the moving parts.

Another object of this invention is to line the grooves of the rollers with a shock absorbing material, which eliminates noise, such as rubber.

Another object of this invention resides in the provisions of two thrust absorbing rollers rotatably mounted at the junction of the back rest frame and seat bottom, thus preventing any tendency to binding and assisting the vertical movement of the moving frame.

Another object of this invention resides in the provision of means for absorbing the forward thrust of the seat at the moment when the vehicle is suddenly started or accelerated, and to ease the shock of this thrust against the passenger's back.

Another object of this invention resides in the provision of upper limit-stops which prevent vibration or relative motion between the movable frame and the stationary frame in an upward direction when no passengers are sitting on the seat.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a vertical sectional view, the section being taken as on line 3—3 in Figure 1.

Figure 4 is a fragmentary view of the stationary frame, having embodied in the cross members thereof, means for longitudinal adjustment.

Figure 5 is a front elevation of a modified unitary seat and shows an arrangement of frames having tubular uprights and wherein the outer frame is the stationary frame, as contrasted with the disclosure shown in Figure 1 wherein the outer frame is the movable frame.

Figure 6 is a top elevation of the unitary seat shown in Figure 5.

Figure 7 is a vertical sectional view, the section being taken as on line 7—7 in Figure 5.

Figure 8 is a side elevation of the unitary seat shown in Figures 5, 6 and 7, one foot of the stationary frame being sectioned and having embodied therein means for absorbing the forward thrust of the seat.

Figure 9 is a fragmentary back view, partly in section, of the seat shown in Figure 8.

Figure 10 is an enlarged fragmentary detail sectional view of roller mechanism shown in Figure 7, the section being taken as on line 7—7 in Figure 5.

Figure 11 is an enlarged fragmentary detail front elevation of the roller mechanism shown in Figure 5 and shows eccentric means for setting up and locking the rollers.

Figure 12 is a horizontal sectional view of the roller mechanism, the section being taken as on line 12—12 in Figure 11.

Figure 13 shows a detail view of a hexagonal pin used for adjusting the rollers.

Figure 14 is a fragmentary front elevation of the unitary seat shown in Figure 5, and shows diagrammatically an embodiment of automatic means for compensating for wear of the moving parts.

Figure 15 is a fragmentary top elevation looking down on Figure 14.

Figures 16, 17 and 18 are detail enlargements of the roller, eccentric bushing and pin mechanism shown in Figures 14 and 15.

Figure 1:
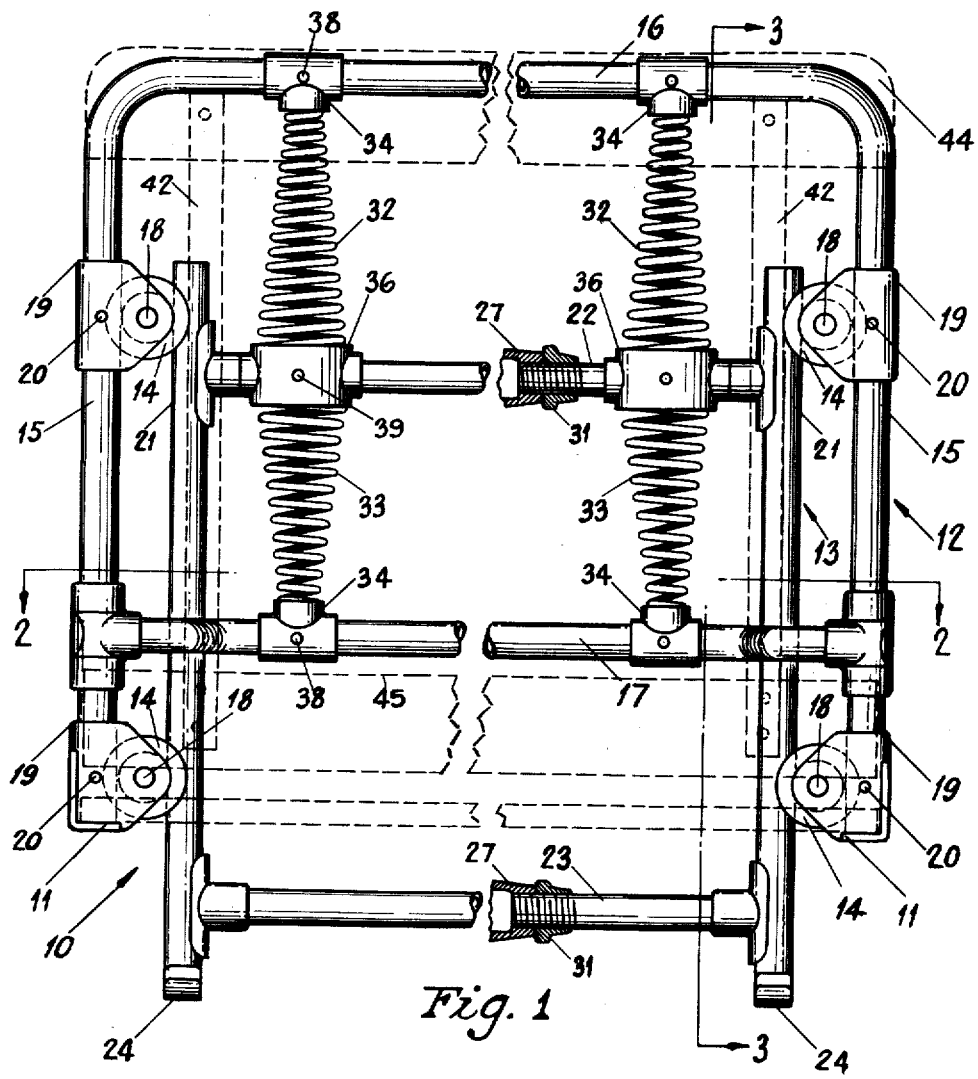
Figure 1 is a front elevation of a unitary seat embodying the invention as installed in automobiles.
Figure 2:
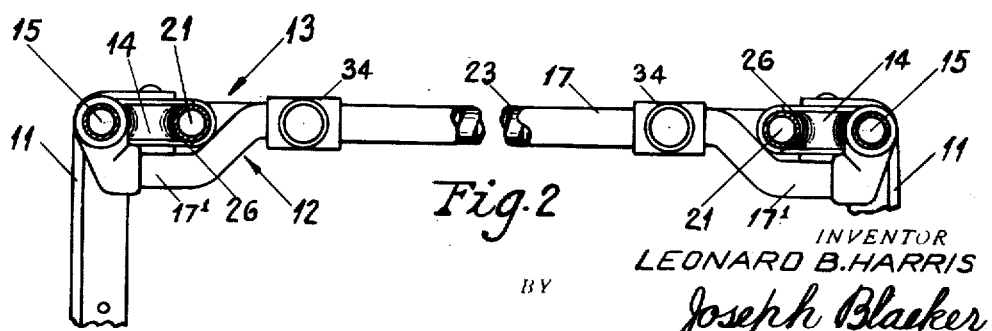
Figure 2 is a cross-sectional view, the section being taken as on line 2—2 in Figure 1.

In the illustrated embodiment of the invention, Figures 1 to 4 disclose a unitary vehicle seat 10, comprising a seat bottom 11, and a back rest frame 12, rigidly fastened together as a right-angular unit. The back rest frame 12 and seat bottom 11, are mounted for generally vertical movement in relation to a stationary frame 13, through the intermediary of sheave rollers 14, 14. The back rest frame 12, comprises two tubular uprights 15, 15, an upper cross member 16, and a lower cross member 17, positioned in spaced level planes. The rollers 14, 14, are mounted on pins 18, 18, in housings 19, 19, and fixed to the uprights 15, 15, by means of pins 20, 20. As best shown in Figure 2, all the rollers are mounted to operate in a single plane passing through the center lines of the tubular uprights of the frames.

The stationary frame 13, comprises two tubular uprights 21, 21, fastened together by an upper cross member 22, and a lower cross member 23, and is provided with angular extensions 24, 24, for mounting the frame in fixed relation to the floor 25, or to the chassis frame of a vehicle. As best shown in Figure 2, the rollers 14, 14, are respectively provided with a semi-circular groove 26, for engagement with the tubular uprights 21, 21, of the stationary frame 13. The respective rollers engage with the tubular uprights around their cross sectional circumferences. The cylindrical outer surfaces of the uprights 21, 21, form front and rear and sideways guide tracks for the rollers 14, 14. It will thus be noted that the relative motion between the back rest frame 12, and the stationary frame 13, is facilitated by the rollers 14, 14, and confined by the uprights 21, 21, which guide the seat in its generally vertical movement on all four sides.

As shown in Figure 4, the cross members 22, and 23, of the stationary frame 13, have been provided with turn-buckles 27, having right-hand and left-hand threads 28, and 29, at the respective ends. The turnbuckles provide means for varying the length of the cross members 22, 23, and for the longitudinal adjustment of the uprights 21, 21, in relation to the rollers 14, 14, on the movable frame, so as to compensate for wear taking place between the moving parts. Lock nuts 30, 31, have also been provided at the respective sides of the turnbuckles.

The unitary seat bottom 11, and back rest frame 12, is resiliently supported from the stationary frame 13, by means of upper and lower superposed conical coil springs 32, 32, and 33, 33, positioned above the seat level and rearwards of the back rest. The small end of each of the upper and lower springs 32, 33 being leveled and fastened to spring housings 34, 34, preferably by providing a circumferential groove 35, in each housing and by forcing the smallest end coil of each spring to enter into forced engagement with the said groove. The large end of each spring 32, 33, being leveled and fastened to a spring housing 36, having circumferential grooves 37, 37, to receive in forced engagement the largest end coil of said springs. The housings 34, are mounted in spaced relation on the cross members 16, and 17, of the back rest frame 12, and fixed thereto by means of pins 38, and the housings 36, are mounted on the cross member 22, of the stationary frame 13, and fixed thereto by means of pins 39.

It will thus be noted that the small ends of the upper and lower springs terminate in respective horizontal planes and tend to support the seat in a level plane. The upper springs 32, 32, act in compression for absorbing the downward thrust while the lower springs 33, 33, are opposed to the upper springs 32, 32, and act in compression for checking the rebound of the upper springs and the resultant effect is a mutual damping of the oscillations in both directions which prevents the seat from rebounding violently and provides added comfort for the passengers. As shown in Figures 1 and 2, the upper and lower superposed sets of springs are mounted in the same vertical plane passing through the centers of the tubular uprights and the sheave rollers. The springs are spaced apart in opposed pairs, each pair of springs having a common axis. The upper and lower springs are initially compressed and when, due to irregularities in the roadway, the vehicle is suddenly displaced upwardly, the upper springs 33, 33, at the same time becoming relieved of an equal amount of their initial compression. The additional compression absorbed by the upper set of springs is in direct proportion to the amount of movement of the vehicle body. At the moment of rebound, the action is reversed and the lower springs 33, 33, are fully open and ready to check the reverse motion of the vehicle seat.

I prefer to use conical coil springs so as to provide a resilient supporting structure giving initial softness for light weight passengers. Also, the widening of the coil springs at one end gives the springs more stability in their vertical position and prevents buckling. As shown in Figure 1, the upper springs are initially longer than the lower springs. The extra length takes care of the dead weight of the seat cushion and the back rest frame.

A seat cushion 40, shown in dotted lines, may be removably mounted on the seat bottoms 11, 11, and a back rest cushion 41, may be placed in a generally vertical position in contact with the seat cushion 40. The back rest cushion 41, is provided at its rear face with uprights 42, 42, each having a downwardly facing hook member 43, shown in Fig. 3. The hooks 43 engage with sideways bent portions 17¹ of the cross member 17. The back rest cushion 41 is also provided with upper and lower cross braces 44, 45. The upper cross brace 44 is provided at its rear face with downwardly facing hook members 46. The hooks 46 engage with the upper cross member 16 of the back rest frame 12. The back rest cushion 41 is thus suspended from the cross members 16, 17, and can be easily removed from the back rest frame and easily hung in position thereon.

Referring to the embodiments of the invention shown in Figures 5 to 18, the several views show a unitary vehicle seat 50 comprising a tubular seat bottom 51 and a back rest frame 52, rigidly fastened together by angular members 53, best shown in Figures 7 and 10.

The back rest frame 52 is mounted for generally vertical sliding movement in relation to the stationary frame 54 through the intermediary of rollers 55. The back rest frame 52 comprises two tubular uprights 56, an upper cross member 57, a lower cross member 58, a spreader thimble 59, and a tie rod 60 forming an axle for rollers 61. The rollers 61 are retained by castle nuts 62. The cross members 57 and 58 and the tie rod 60 are positioned in spaced level planes.

The rollers 55 are mounted on adjustable pins 63 and on eccentric bushings 64, best shown in Figures 12, 13 and 18 and are held in operative position in vertically elongated cross bars 65, 66, of the stationary frame 54 which form the supports for the rollers 55. The cross-bar 66 forms the guide track for the roller 61.

The stationary frame 54 comprises two uprights 67 fastened together by an upper vertically elongated cross member 65 and a lower vertically elongated cross member 66 and is provided with feet 68 for mounting the frame in fixed relation to the floor or body of a vehicle. The cross members 65 and 66 have angle strips 69 to which springs 70 and 71 are attached.

As best shown in Figures 10, 12, and 18, the rollers 55 are respectively formed with a semicircular groove 72 for engagement with the tubular uprights 56 of the movable frame 52.

The rollers 55 are lined on their treads or contacting surfaces with a shock absorbing material 73, best shown in Figures 12 and 18, such as rubber of a yielding composition. The rollers 55 engage with the tubular uprights around half their cross sectional circumferences. The cylindrical outer surfaces of the uprights 56 form front and rear and sideways guide tracks for the rollers 55. It will thus be noted that the relative motion between the back rest frame 52 and the stationary frame 54 is facilitated by the rollers 55 and confined by the uprights 67, which guide the seat in its generally vertical movement on all four sides.

A set of rollers 61 are mounted on the extended tie rod 60 which passes through the angular members 53. The angular members 53 securely fasten the tubular seat bottom 51 to the back rest tubular uprights 56 by being inserted therein. The rollers 61 are at right angles to the rollers 55 and press against and roll upon the cross member 66 of the stationary frame 54 thereby absorbing some of the lateral reaction or binding strain off the rollers 55, as shown in Figures 7 and 10. It is to be noted that the cross member 66 is a plane-surfaced member extending the entire width of the stationary frame and is fixed to and extends around the uprights 67 of the stationary frame 54 and functions as a guide-track.

The rollers 55 are mounted on bushings 64 concentric to the periphery of the rollers. Through these bushings pass pins 63 of a cross section other than circular, such as hexagon. The holes in these bushings correspond in shape to the cross section of the pins and are off center or eccentric to the periphery of the bushings 64. These pins 63, Figures 11, 12 and 13, extend beyond the bushings 64 through holes of the same cross sectional shape as the pins, in the cross members 65, 66 of the stationary frame 54 thereby locking the bushing in any desired rotary position. The pins are on two locations, as best shown in Figures 12 and 13, relieved of their hexagon shape and rounded at points 74 and 75. The pins also have rounded peripheral grooves at 76 to receive hairpins 77 to lock pins 63 endwise. It will be seen in Figure 13 that one hairpin 77 has been removed and on withdrawing pin 63 a small distance through the cross bars 65, 66, that pin 63 and eccentric bushing 64 can be turned and thus bring rollers 55 closer or farther away from the uprights 51, for assembly adjustment or to take up for wear. By pushing the pin 63 back into the position shown in Figure 12 and replacing hairpin 77, the roller is locked in its new position but free to rotate on its bushing 64.

An alternative method of mounting the rollers 55 is shown in Figures 14 to 18, wherein the holes in the cross bars 65 and 66 are round. The mounting of the eccentric bushings 64 and rollers 55 is as previously described. A small washer 78, Figure 18, with a hexagon hole is loosely fitted on the pin 63 at the lever end to allow the hexagon portion of the pin 63 to pass through the cross bars 65 and 66. It will be seen that this modification allows the pin 63 and the bushing 64 to revolve in the cross members 65 and 66. At one end of the pins 63 are attached levers 79 and between the upper and lower levers and attached thereto is stretched a spring 80 which keeps a constant strain on the levers 79 and through them a strain is transmitted to the pins 63 and the eccentric bushings 64, tending to turn them and thus holding the rollers 55 automatically in contact with the uprights 56 of the movable frame 52.

The seat bottom 51 and the back rest frame 52 are resiliently supported from the stationary frame 54 by means of a plurality of upper and lower conical coil springs 70 and 71. The small end of each of the upper and lower springs 70 and 71 is levelled and fastened to the cross member 58 of the movable frame 52 by fastenings 81. The large end of each spring 70 and 71 is levelled and fastened to the angle 69 of the cross members 65, 66 of the stationary frame 54 in spaced relation, and secured by fastenings 82. It will thus be noted that the small ends of the upper and lower springs terminate in respective horizontal planes and tend to support the seat in a level plane.

The lower springs 71 act in compression for absorbing the upward thrust of the floor of the vehicle, while the upper springs 70 are opposed to the lower springs 71 and act in compression for checking the reaction of the lower springs, the resultant effect being a mutual damping of the oscillations in both directions which prevents the seat from rebounding violently and provides added comfort to the passengers.

As shown in Figure 5, the upper and lower sets of springs are mounted in the same vertical plane and spaced apart in opposed pairs, each pair of springs having a common axis. The upper and lower springs are initially compressed when assembled and when, due to irregularities in the roadway, the vehicle is suddenly displaced upwardly, the lower springs 71 become additionally compressed, the upper springs 70 at the same time becoming relieved of an equal amount of their initial compression. The additional compression absorbed by the lower set of springs is in direct proportion to the amount of movement of the vehicle body. At the moment of rebound, the action is reversed and the upper springs 70 are fully open and ready to check the reverse motion of the vehicle seat.

I prefer to use conical coil springs so as to provide a resilient supporting structure giving initial softness for light weight passengers. It has been found that with one light weight passenger, the largest diameter and therefore the weakest coil in the springs 71 close up and become inoperative. The remaining coils being of smaller diameter have more strength. When two heavy passengers sit on the seat, the next largest coils in the springs 71 close up, the remaining small diameter coils being very strong, take care of the inertia of the heaviest passengers. In practice, the seat herein disclosed has been found to work as well with a 60 pound child as with three 150 pound passengers. Also, the widening of the coil springs at one end gives the springs more stability in their vertical position and prevents buckling. As shown in Figure 5, the lower springs are initially longer than the upper springs. The extra length takes care of the dead weight of the seat cushion and back rest frame 52.

It will be noted that the dual spring system, best shown in Figure 5, may be mounted between the upper three cross members 57, 69 and 58 and produce equivalent results. Also, it will be noted that the upper and lower springs may be closed coil springs and initially in tension and produce an equivalent result. A seat cushion 83, shown in dot and dash lines in Figure 7, may be removably mounted on the seat bottom 51 and a removable back rest cushion 84 may be placed in generally vertical position in contact with the back rest frame 52. The back rest cushion 84 is provided at its rear face with a frame 85 shown in Figure 7, and having a top cross brace 86. The cross brace 86 is provided at its rear face with a downwardly facing clip hook member 87. The hook members 87 engage with the upper cross member 57 of the back rest frame 52. The back rest cushion 84 is thus suspended from the cross member 57 and can be easily removed from the back rest frame and easily hung in position thereon. The seat cushion 83, shown in Figure 7, is provided on its bottom side with a frame 88 having a front cross brace 89 and a back cross brace 90.

The front cross brace 89 is provided with an open hinge clip 91 to engage the cross portion of the seat bottom 51. The cross brace 90 is provided with spring clips 92 to engage with the side members of the seat bottom 51. The method of removing the cushions is shown in dot and dash lines in Figure 7.

By referring to Figures 8 and 9, it will be seen that a further means of eliminating the shock while riding in the vehicle seat, disclosed in this invention, is provided in the feet 68 to create a toe and heel effect. To the bottom ends of the tubular uprights 57, of the stationary frame 54, bell crank lever shaped extensions 93 are fastened, the toe or front end being formed into an eye 94, through which passes a fulcrum pin or bolt 95 fixedly secured into the foot piece 68. The heel 96 of the lever 93 rests on a bow spring 97 secured at one end and held in position by bolt 98 exerting an upward force when the seat 50 is in position, as shown by full lines in Figure 8, this upward energy holding the instep of the lever against stop pin 99 and rubber sleeve 100, held securely in position shown in foot 68. While a bow spring is shown under the heel, a rubber cushion piece can be substituted.

It has been shown that at the time of starting up a vehicle or the sudden dropping of the front wheels into a road hollow, that the heel 96 of lever 93 depresses spring 97 gently and allows the seat to throw back approximately one and a half inches at the top for each one-eighth of an inch that the spring is depressed, as shown in dotted lines in Figure 8. This throw back of the seat in conjunction with the vertical shockless action of the dual spring system gave greater comfort in riding.

In Figures 5, 10 and 11, there are shown stop pins 101 and rubber sleeves 102 fastened to the cross member 66 of the stationary frame 54. These stops contact the cross spreader 59 of the movable frame when no passengers are on the seat and prevent vibration.

It is thus readily seen that there has been provided a light weight vehicle seat having frames made up mainly of tubes and being relatively movable vertically through the intermediary of sheave rollers and being supported on a dual spring system which supplements the action of the vehicle springs.

The dual spring system allows the stationary frame while secured to the vehicle to vibrate in unison with the vehicle body, while the passengers sitting on the movable frame ride substantially in an air line without the road shocks being transmitted to them.

In accordance with the patent statutes I have described and illustrated a number of preferred embodiments of my invention, but it will be understood that various changes and modifications can be made therein without departing from the spirit of the invention as defined by the appended claims.

I claim:

1. In a seat structure for vehicles, the combination of a stationary frame and a unitary seat and back rest frame mounted in relation to the stationary frame for generally vertical movement, said stationary frame being designed to be fastened to the vehicle and comprising two spaced uprights having a circular cross section fastened together by a cross member, the back rest frame of said movable frame comprising two spaced uprights having a circular cross section and having a plurality of sheave rollers fixedly mounted on each of said uprights, all rollers on said movable uprights being mounted to operate in a single plane passing through the center lines of the tubular uprights of both frames and being grooved for engagement with said stationary frame at the outside surface of the oppositely disposed uprights, the axes of all the rollers being transverse to the plane of the frames, said back rest frame being guided in its vertical movement by said stationary frame.

2. A multiple-passenger bench seat comprising a movable seat bottom and back rest frame and a stationary frame, said seat and back rest frame being housed and resiliently supported for upright oscillations in relation to the stationary frame, said stationary frame being designed to be fastened to a floor and comprising two spaced uprights having a circular cross-section fastened together by a cross member, the back rest frame of said movable frame comprising two spaced uprights having a circular cross-section and a plurality of sheave rollers fixedly mounted on each of said uprights, all rollers on said movable uprights being mounted to operate in a single plane passing through the center lines of the tubular uprights of both frames and being grooved for engagement with said stationary frame at the outside surface of the oppositely disposed uprights, the axes of all the rollers being transverse to the plane of the frames, said back rest frame being guided in its vertical movement by said stationary frame, said resilient support comprising a plurality of longitudinally spaced abutting upper and lower opposedly compressed conical coil springs positioned above the seat lever, said springs tending to support said seat in a level plane and mutually damping the said oscillations, one end of each of said springs being fastened to said stationary frame and the other ends of said springs being fastened to said movable frame.

3. In a seat structure for vehicles, the combination of a stationary frame and a unitary seat and back rest frame mounted for generally vertical movement in relation to the stationary frame, said stationary frame being designed to be fastened to the vehicle and comprising two spaced uprights fastened together by a cross member, the back rest frame of said movable frame comprising two spaced uprights fastened together by a cross-member and arranged in the same plane with the uprights of said stationary frame, each upright of the movable frame being spaced slightly from the corresponding upright of said stationary frame, the uprights of one of the frames having a plurality of sheave rollers fixedly mounted thereon, the uprights of the other frame having a circular cross section, all rollers being mounted to operate in a single plane passing through the center lines of the uprights of both frames, and being grooved for engagement with the circular uprights, the axes of all the rollers being transverse to the plane of the frames, said back rest frame being guided in its vertical movement by said stationary frame.

4. In a seat structure for vehicles, the combination of a stationary frame and a unitary seat and back rest frame mounted for generally vertical movement in relation to the stationary frame, said stationary frame being designed to be fastened to the vehicle and comprising two spaced uprights fastened together by a cross member, the back rest frame of said movable frame comprising two spaced uprights fastened together by a cross-member and arranged in the same plane with the uprights of said stationary frame, each upright of the movable frame being spaced slightly from the corresponding upright of said stationary frame, the uprights of one of the frames having a plurality of sheave rollers fixedly mounted thereon, the uprights of the other frame having a circular cross section, all rollers being mounted to operate in a single plane passing through the center lines of the uprights of both frames, and being grooved for engagement with the circular uprights, the axes of all the rollers being transverse to the plane of the frames, said back rest frame being guided in its vertical movement by said stationary frame, and a plurality of rollers mounted on the lower end of the movable frame at right angles to said sheave rollers, said lower rollers being in contacting relation with a guide-track fixed to said stationary frame for absorbing rearward thrust of said seat, said guide-track extending sufficiently vertically to permit said lower rollers to contact therewith in all vertical positions of said movable frame.

5. In a vehicle seat having a frame and angular lever extensions pivotally mounted about fulcrums, said extensions and fulcrums being mounted in feet having resilient means therein which permit limited and tensioned rearward radial movements of said seat.

LEONARD B. HARRIS.

CERTIFICATE OF CORRECTION.

Patent No. 2,149,290.    March 7, 1939.

LEONARD B. HARRIS.

It is hereby certified that error appears in the printed specification of the above numbered patent requiring correction as follows: Page 5, first column, line 22, claim 2, for the word "lever" read level; and that the said Letters Patent should be read with this correction therein that the same may conform to the record of the case in the Patent Office.

Signed and sealed this 20th day of June, A. D. 1939.

Henry Van Arsdale (Seal)    Acting Commissioner of Patents.

being housed and resiliently supported for upright oscillations in relation to the stationary frame, said stationary frame being designed to be fastened to a floor and comprising two spaced uprights having a circular cross-section fastened together by a cross member, the back rest frame of said movable frame comprising two spaced uprights having a circular cross-section and a plurality of sheave rollers fixedly mounted on each of said uprights, all rollers on said movable uprights being mounted to operate in a single plane passing through the center lines of the tubular uprights of both frames and being grooved for engagement with said stationary frame at the outside surface of the oppositely disposed uprights, the axes of all the rollers being transverse to the plane of the frames, said back rest frame being guided in its vertical movement by said stationary frame, said resilient support comprising a plurality of longitudinally spaced abutting upper and lower opposedly compressed conical coil springs positioned above the seat lever, said springs tending to support said seat in a level plane and mutually damping the said oscillations, one end of each of said springs being fastened to said stationary frame and the other ends of said springs being fastened to said movable frame.

3. In a seat structure for vehicles, the combination of a stationary frame and a unitary seat and back rest frame mounted for generally vertical movement in relation to the stationary frame, said stationary frame being designed to be fastened to the vehicle and comprising two spaced uprights fastened together by a cross member, the back rest frame of said movable frame comprising two spaced uprights fastened together by a cross-member and arranged in the same plane with the uprights of said stationary frame, each upright of the movable frame being spaced slightly from the corresponding upright of said stationary frame, the uprights of one of the frames having a plurality of sheave rollers fixedly mounted thereon, the uprights of the other frame having a circular cross section, all rollers being mounted to operate in a single plane passing through the center lines of the uprights of both frames, and being grooved for engagement with the circular uprights, the axes of all the rollers being transverse to the plane of the frames, said back rest frame being guided in its vertical movement by said stationary frame.

4. In a seat structure for vehicles, the combination of a stationary frame and a unitary seat and back rest frame mounted for generally vertical movement in relation to the stationary frame, said stationary frame being designed to be fastened to the vehicle and comprising two spaced uprights fastened together by a cross member, the back rest frame of said movable frame comprising two spaced uprights fastened together by a cross-member and arranged in the same plane with the uprights of said stationary frame, each upright of the movable frame being spaced slightly from the corresponding upright of said stationary frame, the uprights of one of the frames having a plurality of sheave rollers fixedly mounted thereon, the uprights of the other frame having a circular cross section, all rollers being mounted to operate in a single plane passing through the center lines of the uprights of both frames, and being grooved for engagement with the circular uprights, the axes of all the rollers being transverse to the plane of the frames, said back rest frame being guided in its vertical movement by said stationary frame, and a plurality of rollers mounted on the lower end of the movable frame at right angles to said sheave rollers, said lower rollers being in contacting relation with a guide-track fixed to said stationary frame for absorbing rearward thrust of said seat, said guide-track extending sufficiently vertically to permit said lower rollers to contact therewith in all vertical positions of said movable frame.

5. In a vehicle seat having a frame and angular lever extensions pivotally mounted about fulcrums, said extensions and fulcrums being mounted in feet having resilient means therein which permit limited and tensioned rearward radial movements of said seat.

LEONARD B. HARRIS.

CERTIFICATE OF CORRECTION.

Patent No. 2,149,290.                                    March 7, 1939.

LEONARD B. HARRIS.

It is hereby certified that error appears in the printed specification of the above numbered patent requiring correction as follows: Page 5, first column, line 22, claim 2, for the word "lever" read level; and that the said Letters Patent should be read with this correction therein that the same may conform to the record of the case in the Patent Office.

Signed and sealed this 20th day of June, A. D. 1939.

Henry Van Arsdale (Seal)                                    Acting Commissioner of Patents.